(12) United States Patent
Horowitz et al.

(10) Patent No.: US 8,099,463 B2
(45) Date of Patent: Jan. 17, 2012

(54) METHOD AND APPARATUS FOR SHARING CONCURRENT AD HOC WEB CONTENT BETWEEN USERS VISITING THE SAME WEB PAGES

(75) Inventors: Steven Horowitz, Oakland, CA (US); Lucas J. Shuman, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 787 days.

(21) Appl. No.: 12/174,203

(22) Filed: Jul. 16, 2008

(65) Prior Publication Data

US 2010/0017412 A1  Jan. 21, 2010

(51) Int. Cl.
  *G06F 3/048* (2006.01)
  *G06F 17/30* (2006.01)
(52) U.S. Cl. .................. 709/204; 709/205; 709/227
(58) Field of Classification Search .......... 709/204, 709/202, 205, 218, 227–229, 246
See application file for complete search history.

(56) References Cited

U.S. PATENT DOCUMENTS

| | | | | |
|---|---|---|---|---|
| 7,287,054 | B2 * | 10/2007 | Lee et al. ............ | 709/204 |
| 7,533,146 | B1 * | 5/2009 | Kumar ............... | 709/205 |
| 2004/0225716 | A1 * | 11/2004 | Shamir et al. ........ | 709/204 |
| 2008/0126484 | A1 | 5/2008 | Wherry et al. | |
| 2008/0155104 | A1 | 6/2008 | Quinn et al. | |

FOREIGN PATENT DOCUMENTS

| | | |
|---|---|---|
| JP | 2005-149387 A | 6/2005 |
| KR | 10-2008-0026917 A | 3/2008 |

OTHER PUBLICATIONS

Written Opinion of the International Searching Authority for Related Foreign Application PCT/US2009/047956.
International Search Report for Related Foreign Application PCT/US2009/047956.

* cited by examiner

*Primary Examiner* — Wing Chan
*Assistant Examiner* — Ruolei Zong
(74) *Attorney, Agent, or Firm* — Stattler-Suh PC

(57) ABSTRACT

A method and apparatus are provided for sharing concurrent ad hoc Web content between users visiting the same Web domain, sub-domain, section or page. In one example, the method includes associating a user with a current uniform resource locator and Web domain, sub-domain, section or page being browsed by parsing the current uniform resource locator of the current Web page, creating a Web content sharing group by identifying one or more other users with whom the user would like to share, saving current uniform resource locators of pages being browsed calculating a status of the Web content sharing group by determining if any users in the Web content sharing group are currently browsing on a same Web domain, sub-domain, section or page as the user, and communicating the status of the Web content sharing group with a front-end device.

29 Claims, 7 Drawing Sheets

METHOD AND APPARATUS FOR SHARING CONCURRENT AD HOC WEB CONTENT BETWEEN USERS VISITING THE SAME WEB PAGES

FIELD OF THE INVENTION

The present invention relates to sharing Web content. More particularly, the present invention relates to sharing concurrent ad hoc Web content between users visiting the same Web pages.

BACKGROUND OF THE INVENTION

Browsing content on the Web typically has been a solitary experience. If the user encounters content (e.g., text, images, audio, video, or complete Web pages) that the user wants to share, the user has had the following options: Find one or more users known to the first user, identified in the first user's email address book, instant message buddy list, phone contact list, or social network friends list; or find one or more other users with the same interests, through collaborative filtering, clustering, or other affinity grouping method. The user has also had the following options: Cut and paste, download, provide a link to, rate, caption and/or comment on the content; send one or more of these via email, instant message, SMS; or post on the user's social network profile page or send to other users through vitality, etc.

If the first user wants to interact with the content being browsed by a second user in real time, the first user would have to see if the second user is online or cause the second user to go online, establish chat via instant messenger, and then send the second user the content or link. If not on the same instant message service, the first user would have to have the second user retrieve the content or link by email. Furthermore, the second user at that moment may not have the time, inclination or affinity for sharing.

Conventional devices provide collaborative Web document editing or allow users to interact with common media on the Web in real time. However, the users are the content generators, and these interactions are scheduled a priori.

SUMMARY OF THE INVENTION

What is needed is an improved method having features for addressing the problems mentioned above and new features not yet discussed. Broadly speaking, the present invention fills these needs by providing a method and apparatus for sharing concurrent ad hoc Web content between users visiting the same Web pages. It should be appreciated that the present invention can be implemented in numerous ways, including as a method, a process, an apparatus, a system or a device. Inventive embodiments of the present invention are summarized below.

In one embodiment, a back-end method is provided for sharing concurrent Web content between users visiting the same Web pages. The back-end method comprises associating a user with a current uniform resource locator (URL) of the current Web page being browsed and a current "Web entity," defined as domain (e.g., yahoo.com), sub-domain (e.g., news.yahoo.com), section (e.g., news.yahoo.com/elections) or page (e.g., news.yahoo.com/election/2008/candidates/barack-obama) derived by parsing the URL, creating a Web content sharing group (WCSG) by identifying one or more other users with whom the user would like to share, associating each of these users with the current URL and Web entity of the current Web page each is browsing (null if none), calculating a status of the WCSG by determining if any users in the WCSG are currently browsing the same Web entity as the user, and communicating the current Web page URLs and status of the WCSG with a front-end device.

In another embodiment, a front-end method is provided for sharing concurrent Web content between users visiting the same Web pages. The front-end method comprises receiving the current Web page URLs and status of a WCSG associated with a user, representing visually the current Web page URLs and status of the WCSG on a front-end device of a user, optionally receiving a user click on one of the URLs displayed to load the corresponding Web page and send that URL to the back-end device to update any WCSG of which the user is a member, receiving a selection of one or more users in the WCSG, and communicating the selection with a computer of the one or more users.

In still another embodiment, a back-end apparatus is provided for sharing concurrent Web content between users visiting the same Web pages. The back-end apparatus is configured to associate a user with a current URL of the current Web page being browsed and a current Web entity derived by parsing the URL, to create a WCSG by identifying one or more other users with whom the user would like to share, to associate each of these users with the current URL and Web entity of the current Web page each is browsing (null if none), to calculate a status of the WCSG by determining if any users in the WCSG are currently browsing the same Web entity as the user, and to communicate the current Web page URLs and status of the WCSG with a front-end device.

In yet another embodiment, a front-end apparatus is provided for sharing concurrent Web content between users visiting the same Web pages. The front-end apparatus is configured to receive the current Web page URLs and status of a WCSG associated with a user, to represent visually the current Web page URLs and status of the WCSG on a front-end device of a user, optionally to receive a user click on one of the URLs displayed to load the corresponding Web page and send that URL to the back-end device to update any WCSG of which the user is a member, to receive a selection of one or more users in the WCSG, and to communicate the selection with a computer of the one or more users.

In still yet another embodiment, a computer readable medium carrying one or more instructions for sharing concurrent Web content between users visiting the same Web pages is provided. The one or more instructions, when executed by one or more processors, cause the one or more processors to perform the steps of associating a user with a current URL of the current Web page and a current Web entity derived by parsing the URL, creating a WCSG by identifying one or more other users with whom the user would like to share, associating each of these users with the current URL and Web entity of the current Web page each is browsing (null if none), calculating a status of the WCSG by determining if any users in the WCSG are currently browsing the same Web entity as the user, and communicating the current Web page URLs and status of the WCSG with a front-end device.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention is disclosed for a method and apparatus for sharing concurrent ad hoc Web content between users visiting the same Web page. Numerous specific details are set forth in order to provide a thorough understanding of the present invention. It will be understood, however, to one skilled in the art, that the present invention may be practiced with other specific details.
General Overview Users browsing the same Web page are predisposed to sharing in real time. The system of the present invention allows the user to find out if one or more users are browsing the same Web entity (as defined above). The system allows users to chat and share content, links and metacontent (such as tags and user comments) while browsing the same Web page.

Figure 1:
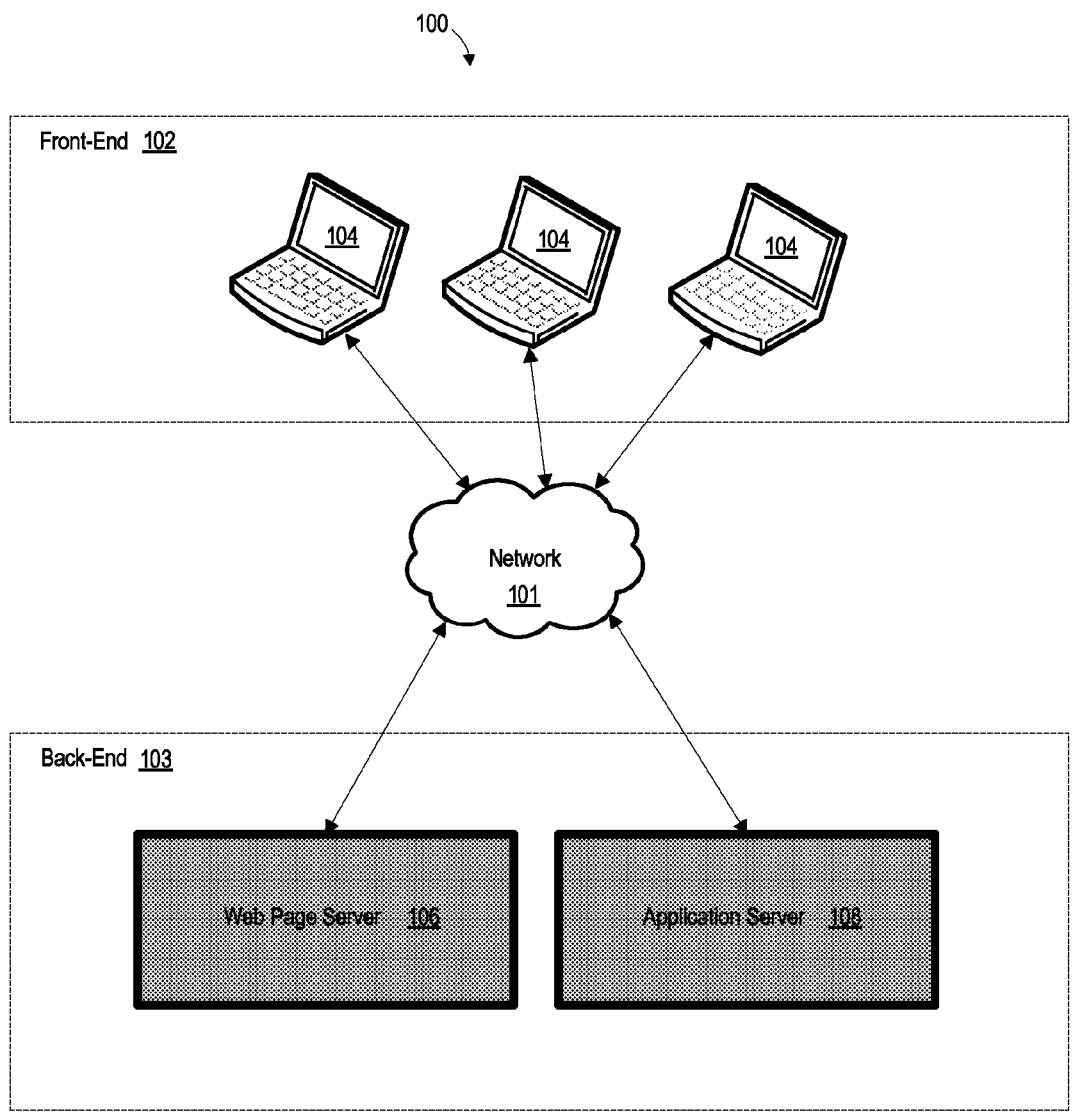
FIG. 1 is a block diagram of a system for sharing concurrent ad hoc Web content between users visiting the same Web pages, in accordance with an embodiment of the present invention.

FIG. 1 is a block diagram of a system 100 for sharing concurrent ad hoc Web content between users visiting the same Web page, in accordance with an embodiment of the present invention. A device of the present invention is hardware, software or a combination thereof. A device may sometimes be referred to as an apparatus. Each device is configured to carry out one or more steps of the method of sharing concurrent ad hoc Web content between users visiting the same Web page.

A network 101 couples together a front-end 102 and a back-end 103. The front-end 102 includes without limitation at least two consumer computers 104. The back-end 103 includes without limitation a Web page server 106 and an application server 108. The network 101 may be any combination of networks, including without limitation the Web, a local area network, a wide area network, a wireless network and a cellular network.

This system 100 facilitates ad hoc content (including links and metacontent) sharing in real-time between users visiting the same Web entities, when the second party is particularly predisposed to sharing. The system 100 sharing may occur within a Web site, such as Yahoo®, or across the Web at large. The user may share information among friends or among unknowns. These selected users with whom the user shares information are part of the user's WCSG.

Figure 2A:
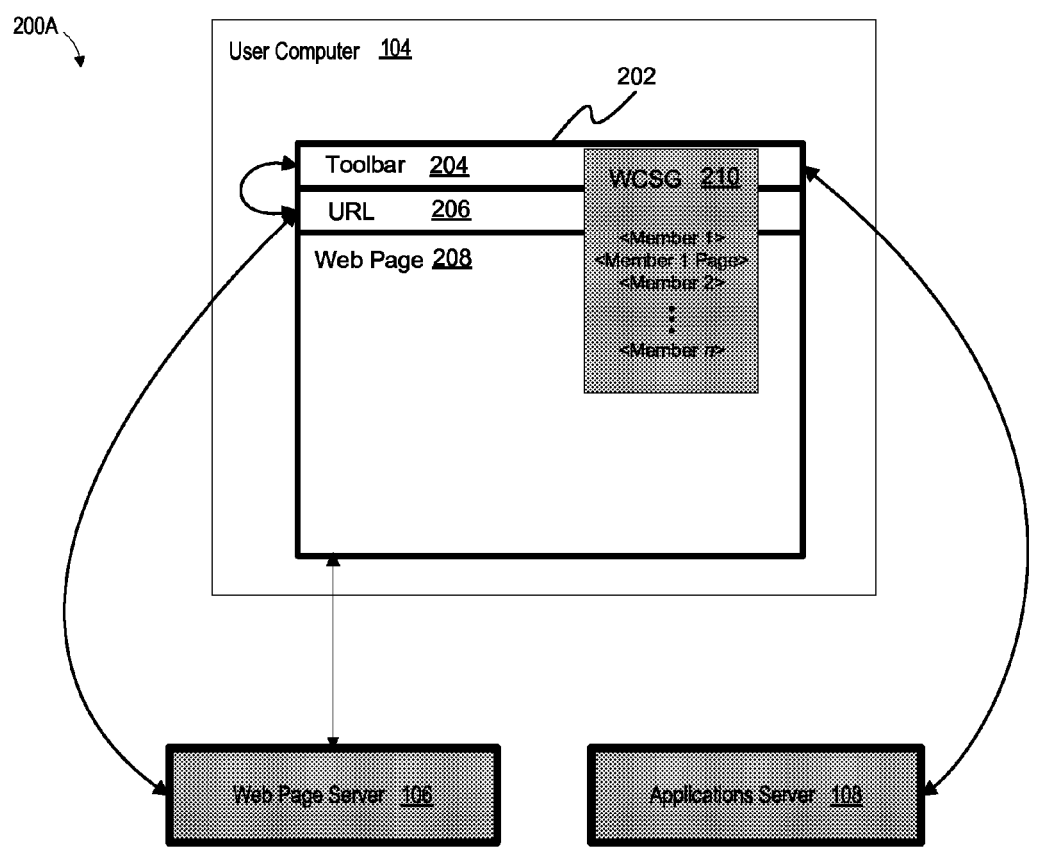
FIG. 2A is a schematic diagram of a system including a toolbar for sharing concurrent ad hoc Web content between users visiting the same Web pages, in accordance with an embodiment of the present invention.
Figure 2B:
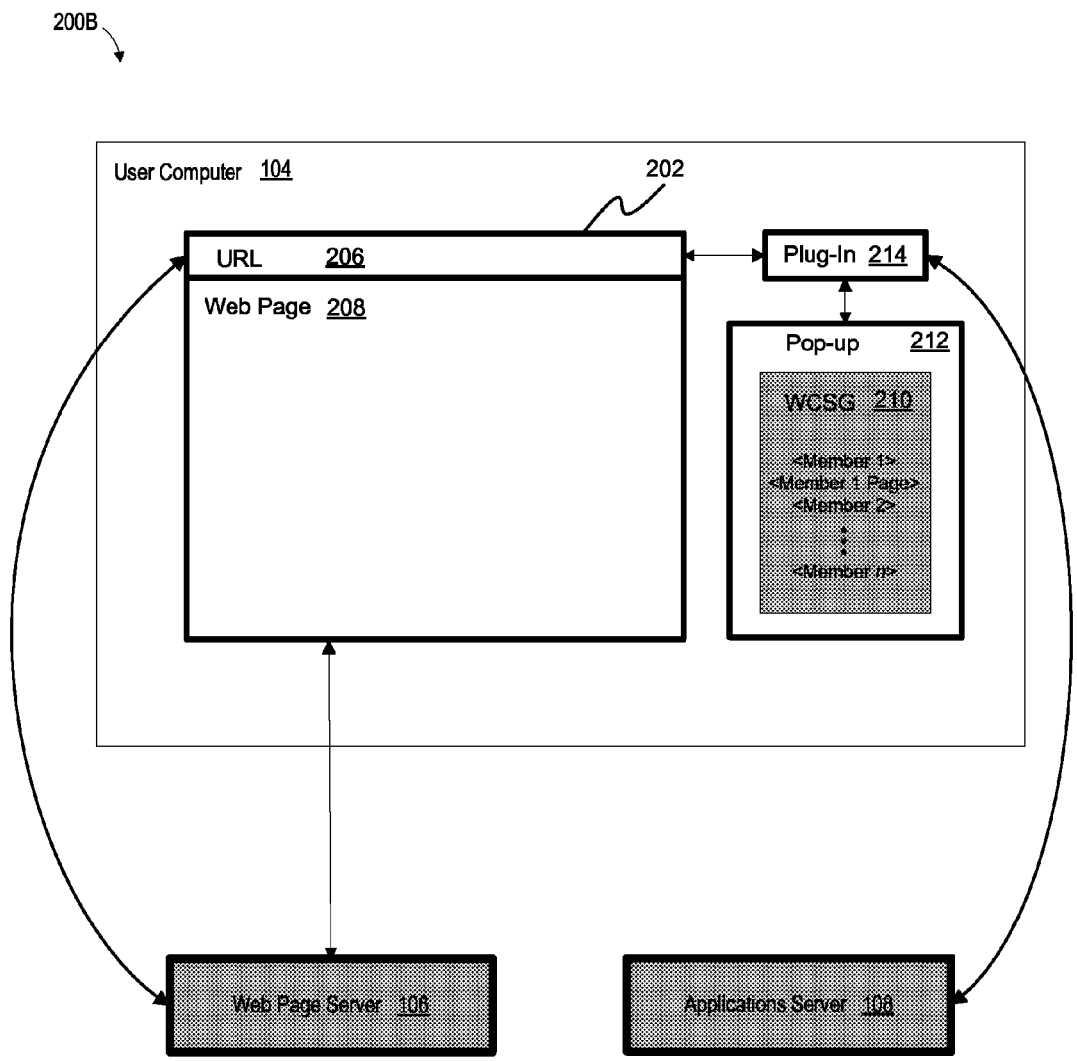
FIG. 2B is a schematic diagram of a system including a pop-up interface (i.e., browser plug-in) for sharing concurrent ad hoc Web content between users visiting the same Web pages, in accordance with an embodiment of the present invention.
Figure 2C:
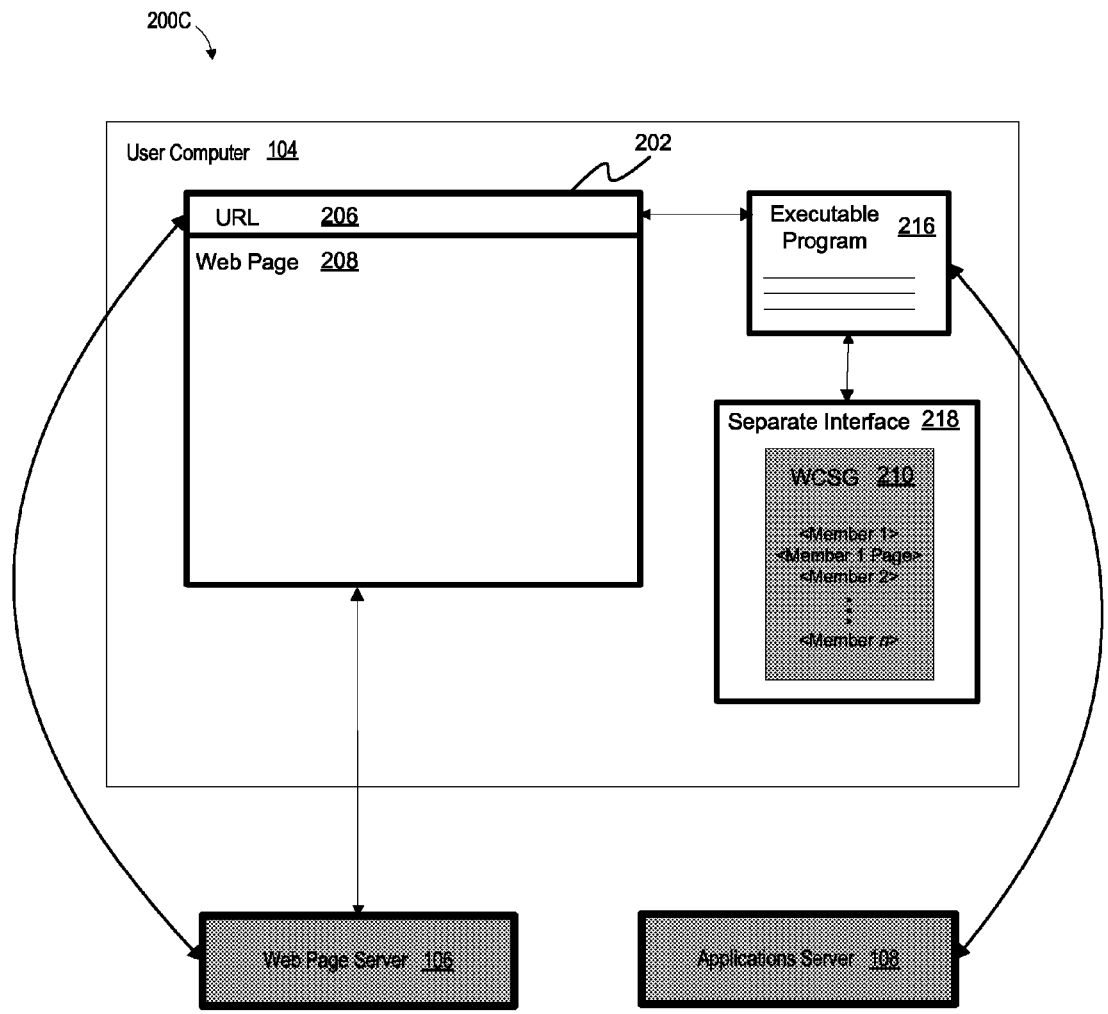
FIG. 2C is a schematic diagram of a system including a separate interface (i.e., executable program) for sharing concurrent ad hoc Web content between users visiting the same Web pages, in accordance with an embodiment of the present invention.
Figure 2D:
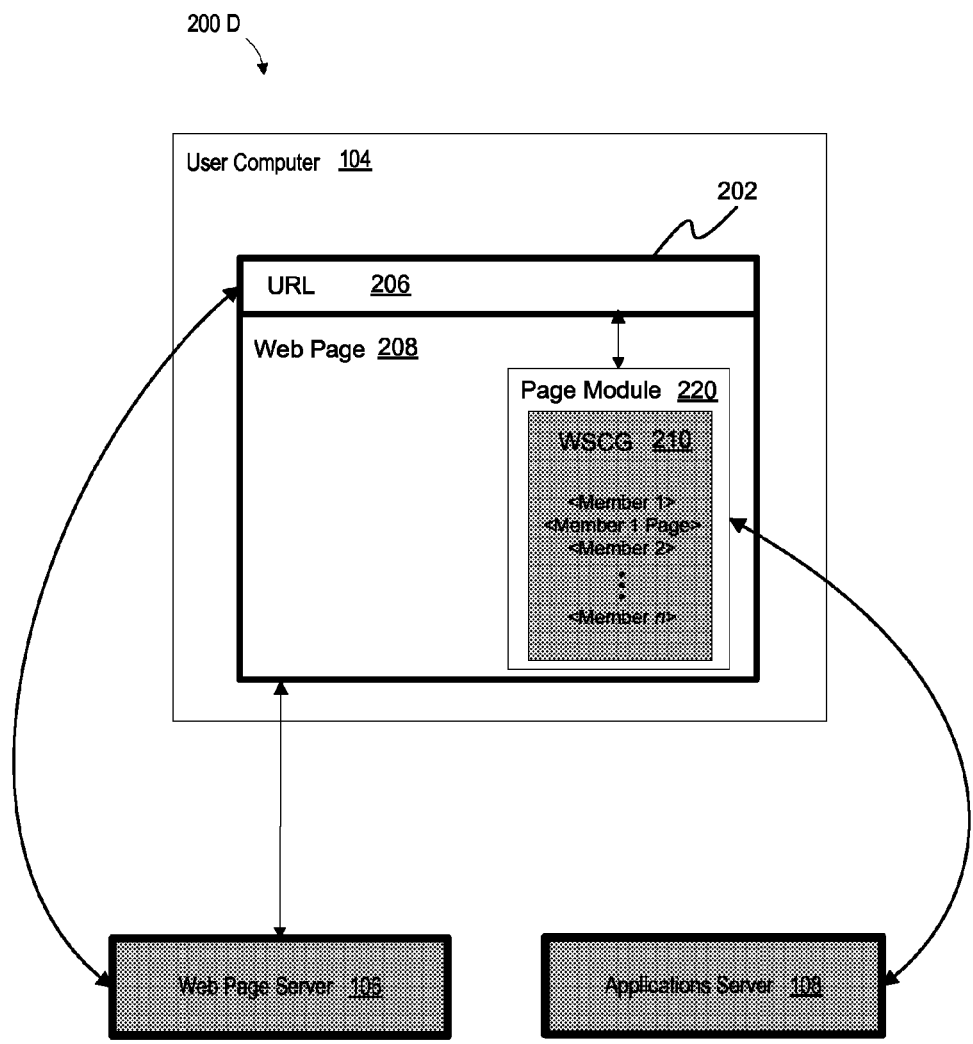
FIG. 2D is a schematic diagram of a system including an embedded interface (i.e. Web page module) for sharing concurrent ad hoc Web content between users visiting the same Web pages, in accordance with an embodiment of the present invention.

The operation of the system will be shown with reference to FIGS. 2A 2D.

FIG. 2A is a schematic diagram of a system 200A including a toolbar 204 for sharing concurrent ad hoc Web content between users visiting the same Web page, in accordance with an embodiment of the present invention. The user computer 104 includes a Web browser 202 that allows the user to browse the Web by receiving Web pages from Web page server 106.
Back-End Components for Sharing Referring still to FIG. 2A, the user computer 104 downloads from the Web page server 106 a toolbar 204 upon visiting the appropriate URL 206 that has the toolbar 204 for download. Upon download and installation, the toolbar 204 sends the current URL 206 of the user to the application server 108 to associate the user with the current URL 206 and Web entity the user is browsing. The application server 108 derives the Web entity by parsing the current URL 206 according to a straightforward regular expression. The application server 108 receives a null if the user has no browser open. The application server 108 creates and maintains a user's dynamic WCSG ( ) 210 by identifying member users via their user computers 104. The WCSG 210 is a manageable group of people browsing the Web at substantially the same time.

For users known to the first user, the identifying occurs by accessing IP (Internet Protocol) addresses, instant messenger buddies, email contacts and/or social network friends, via that user's various login id's and third-party API's (application program interfaces). These users are opted-in to the content sharing application or otherwise receive invitations to join.

For users unknown to the first user, but already logged-in to the content sharing application, the identifying occurs by calculating an attribute-matching metric that is above a certain threshold or by calculating a designated number of closest matches, using any combination of geographic, demographic, psychographic biographic and behavioral (based on analyzing Web page visit history) attributes, accessed by the back-end service.

The application server 108 receives the current URL 206 of the first user from the toolbar 204 application and broadcasts it to users in the WCSG 210. The application server 108 checks if those users are currently browsing the same Web entity as that of the first user. If any of those users are currently browsing the same Web entity, the application server 108 updates the status of the WCSG 210 accordingly. The application server 108 then sends the status of the WCSG 210 to the user computer 104. The application server 108 constantly updates the status of the WCSG 210 according to the behavior of the users in the WCSG 210.
Front-End Components for Sharing Referring still to FIG. 2A, the toolbar 204 application running in conjunction with browser 202 on the user computer 104 requests and receives the status of the WCSG from the application server 108. The toolbar 204 represents visually the status of the user's WCSG 210 and allows the user to select one or more users from the WCSG 210.

For each user that is browsing and logged-in to the system 200A, the toolbar 204 represents visually the status of that particular user. Some status items may include, for example, <Member 1>, <Member 1 Page>, <Member 2>, <Member 2 Page>, etc. A status item for each user in the WCSG may indicate the rough proximity of the current page of each user to a current page of the first user. The toolbar 204 may show this rough proximity using, for example, colors or some other indicator. A gray color associated with <Member 1> may mean <Member 1> is not currently browsing, a white color associated with <Member 1> may mean <Member 1> is not browsing the same domain as the first user; a yellow color associated with <Member 1> may mean <Member 1> is browsing the same domain as the first user, but not the same page; a green color associated with <Member 1> may mean <Member 1> is browsing the same page as the first user. Other colors may be associated with other shared Web entities. With this visual representation, the system provides the first user rough proximity information and the first user may accordingly select a user in the WCSG with which to interact.

In this example, the system 200A shows the WCSG 210 in a drop-down menu of the toolbar 204. The toolbar 204 allows the first user to send and receive content (including links and metacontent) associated with the first user's current page to one or more selected users in the WCSG 210 in real time. The user does this communication by having the user computer 104 initiate a concurrent chat or file sharing session with the selected user. The toolbar 204 may include a broadcasting switch (not shown) that allows the user to turn broadcasting on/off to the other users in the WCSG.

The system 200A optionally allows the first user to cause the page the first user is browsing to open as a separate window (or browser tab) on the display of a user from the first user's WCSG 210 (and vice versa). For example, the first user may click a link to the <Member 1> page in order to have the system 200A open a separate window (or tab) showing the same page as <Member 1>.

FIG. 2B is a schematic diagram of a system 200B including a pop-up interface 212 (i.e., browser plug-in) for sharing concurrent ad hoc Web content between users visiting the same Web page, in accordance with an embodiment of the present invention. The user computer 104 downloads from the Web page server 106 a plug-in 214 upon visiting the appropriate URL 206 that has the plug-in 214 for download. Upon download and installation, the plug-in 214 sends the current URL 206 of the user to the application server 108 and then automatically creates a pop-up 212 that displays the interactive WCSG 210. The user may then interact with the WCSG 210 as discussed above with reference to FIG. 2A, including all of the functional features associated therewith.

FIG. 2C is a schematic diagram of a system 200C including a separate interface 218 (i.e., executable program) for sharing concurrent ad hoc Web content between users visiting the same Web page, in accordance with an embodiment of the present invention. The user computer 104 downloads from the Web page server 106 an executable program 216 upon visiting the appropriate URL 206 that has the executable program 216 for download. When downloaded, installed and executed, the executable program 216 sends the current URL 206 of the user to the application server 108, obtained by inter-application communication protocols (e.g. Windows DDE), and then creates separate interface 218 that displays the interactive WCSG 210. The separate interface 218 may be part of a larger executable program 216 such as an instant message client. The user may then interact with the WCSG 210 as discussed above with reference to FIG. 2A, including all of the functional features associated therewith. The executable program 216 is a program that can run independently of the Web browser 202. Accordingly, the executable program 216 and the separate interface 218 may operate even when the Web browser 202 is inactive or closed, allowing the user to monitor the browsing of WCSG members without actively browsing. When a Web page of interest appears associated with any member in the interface, the user can click on the corresponding link to open the user's Web browser to the member's same page.

FIG. 2D is a schematic diagram of a system 200D including an embedded interface (i.e. Web page "module," also known as a "badge" or "widget") for sharing concurrent ad hoc Web content between users visiting the same Web page, in accordance with an embodiment of the present invention. When the module 220 is embedded on a Web page 208 by Web page server 106 and loaded in browser 202 running on user computer 104, the module 220 sends the current URL 206 of the user to the application server 108 and then automatically updates its interface to display the interactive WCSG 210. The user may then interact with the WCSG 210 as discussed above with reference to FIG. 2A, including all of the functional features associated therewith. Web portals, such as Yahoo®, or other Web sites, have control over all of their pages that the user may browse, and can choose to embed the module on some or all of its pages. The application server may be operated by that same Web site, or independently by a third-party. However, third-party hosting requires a separate user registration Web site (not shown). Also, users wanting to use the system shown in FIG. 2D can do so by visiting any Web site containing a page with embed code for module 220, and then manually copy and paste the code onto pages under their control, for example, MySpace® profiles, individual blogs or personal Web sites.

The sharing application hosted on any third-party domain on the Web can use any of the systems shown in FIGS. 2A-2D to run the front end components when a user loads a new Web page. Any of these front-end interfaces can log in users for the service, and gather known users and potential unknown users by matching with other logged-in users of the service. The sharing application hosted by a Web portal likewise can use any of the systems shown in FIGS. 2A-2D in the same way. The portal, to its advantage, can limit the WCSG 210 to registered logged-in users of the portal to utilize portal profile and social graph information. Portals also can track registered users and associated pages visited on their domain through HTTP (hypertext transfer protocol) headers and cookies.

The system can use any Web page's domain to create the WCSG 210. When the user loads a new Web page, the front-end interfaces transmit the URL 206 to the back-end components. As shown in FIG. 2A, the toolbar 204 can open a drop-down menu to run the front-end components. Alternatively, as shown in FIG. 2B, the plug-in 214 can open a pop-up window to run the front-end components. Alternatively, as shown in FIG. 2C, the executable program 216 can open a separate interface 218 to run the front-end components. Alternatively, as shown in FIG. 2D, the embedded page module 220 contains the interface to run the front-end components.

Other Features

There are a host of other features that the system may carry out through the WCSG. The system provides a way for users to share their browsing experiences. The system may carry out any kind of feature related to the users sharing their browsing experience. The following describes without limitation some of these additional features.

The back-end can keep an archive of specified pages that another user of the WCSG visited. Those specified pages may, for example, be the last 10 visited sites, the top-10 most visited sites, the sites visited over the last day, or some other specification. The first user may check this archive and see whether or not the archived pages are of interest to the first user. The other user of the WCSG does not have to be logged-in to the system.

The user computer can allow a user to toggle opting in or out of sharing both on a session basis and on a page-by-page basis (before navigating to the page in question). If the user chooses to open the current Web page of another user's browser, there are known methods for synchronizing slide-shows, audio and video, and taking turns controlling the cursor, scrolling, highlighting, etc., on each other's page. If the user agrees, all user content, links and metacontent can be archived and accessed on demand by other users (both in the WCSG or all registered users) for a particular page or domain, either by the user or by aggregation across users of the application.

A user computer can allow a user to run two or more different instances of the WCSG over two or more different Web browser instances, wherein each of the two or more different instances of the WCSG may be associated with different current Web pages. The system, for example, can open multiple browser tabs or windows to pages in different domains of interest, minimize the browser(s), and wait for the user computer to alert the creation of, additions to or deletions from the associated WCSG(s) via sounds, blinking tray label, or other means.

A user computer can allow a first user to watch the pages a second user in the WCSG is browsing concurrently in "shadow mode." For example, the user may click a shadow mode on/off toggle and then click <Member 1>, which causes the browsing experience of <Member 1> to be represented visually to the first user on the user computer in real time. For privacy sake, the user computer preferably sends an alert to the other user computer that the first user is shadowing.

Method Outline

Figure 3:
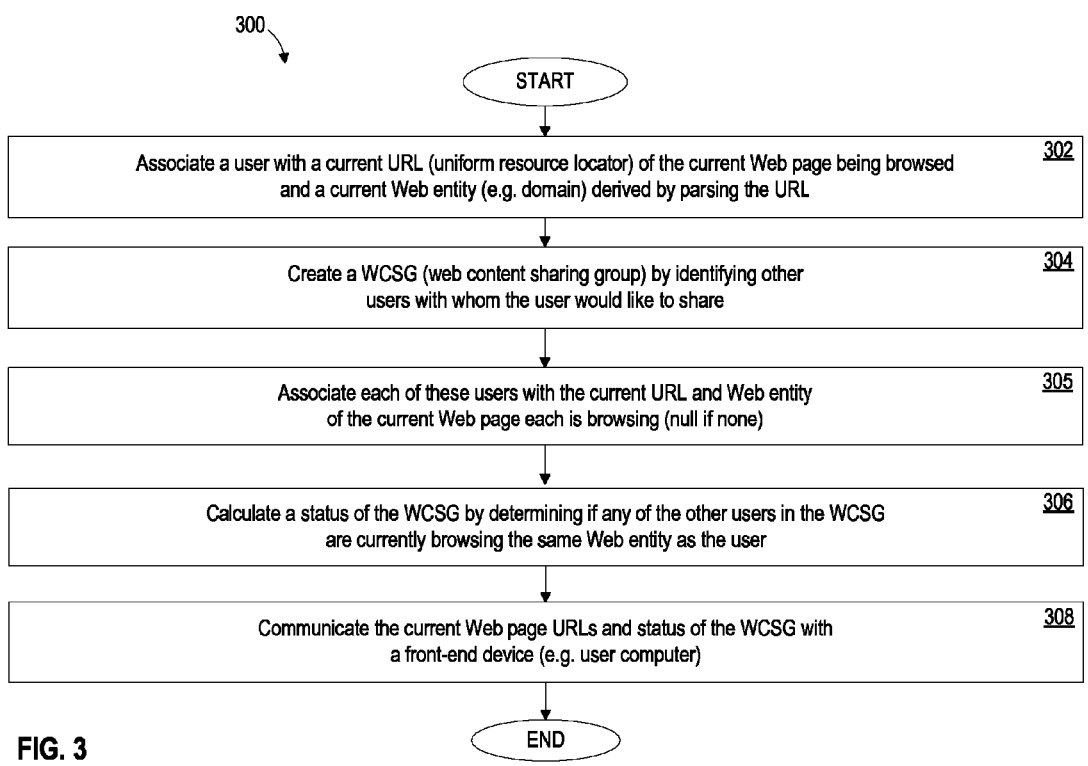
FIG. 3 is a flowchart of a back-end method for sharing concurrent ad hoc Web content between users visiting the same Web pages, in accordance with an embodiment of the present invention.

FIG. 3 is a flowchart of a back-end method 300 for sharing concurrent ad hoc Web content between users visiting the same Web page, in accordance with an embodiment of the present invention. The back-end method 300 may be carried out by a back-end device of the application server 108 of FIG. 1. Details of the operation of the back-end device are described above with reference to FIGS. 2A-2D.

The back-end method 300 starts in step 302 where the back-end device associates a user with a current URL of the current page being browsed, and a current Web entity derived by parsing the URL. The back-end method 300 then moves to step 304 where the back-end device creates a WCSG by identifying other users with whom the user would like to share. Next, in step 305, the back-end device associates each of these users with the current URL and Web entity of the current Web page each is browsing (null if none). Next, in step 306, the back-end device calculates a status of the WCSG by determining if any of the other users in the WCSG are currently browsing on the same Web entity as the user. Proceeding to step 308, the back-end device communicates the current Web page URLs and status of the WCSG with a front-end device (e.g., user computer). The back-end method 300 is then at an end.

Figure 4:
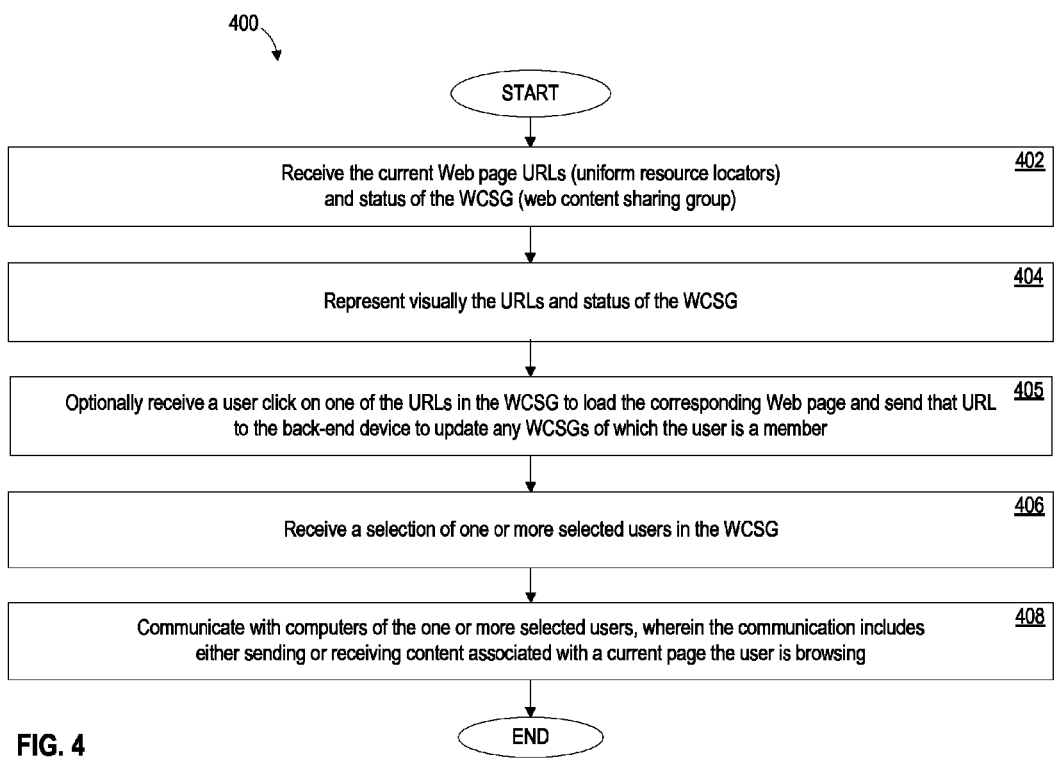
FIG. 4 is a flowchart of a front-end method for sharing concurrent ad hoc Web content between users visiting the same Web pages, in accordance with an embodiment of the present invention.

FIG. 4 is a flowchart of a front-end method 400 for sharing concurrent ad hoc Web content between users visiting the same Web page, in accordance with an embodiment of the present invention. The front-end method 400 may be carried out by a front-end device of the user computer 104 of FIG. 1. Details of the operation of the front-end device are described above with reference to FIGS. 2A-2D.

The front-end method 400 starts in step 402 where the front-end device receives the current Web page URLs and status of the WCSG from a back-end device (e.g., application server). The front-end method 400 then moves to step 404 where the front-end device represents visually the URLs and status of the WCSG on the user computer. Next, in step 405, the front-end device optionally receives a user click on one of the URLs in the WCSG to load the corresponding Web page and sends that URL to the back-end device to update any WCSGs of which the user is a member. Next, in step 406, the front-end device receives a selection of one or more selected users in the WCSG. Proceeding to step 408, the front-end device communicates with computers of the one or more selected users, wherein the communication includes either sending or receiving content associated with either a current page the user is browsing or a current page a user in the WCSG is browsing. The front-end method 400 is then at an end.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including without limitation, associating a user with a current Web entity being browsed by parsing a current uniform resource locator of the current page, creating a WCSG by identifying one or more other users with whom the user would like to share, calculating a status of the WCSG by determining if any users in the WCSG are currently browsing on a same Web entity as the user, and communicating the status of the WCSG with a front-end device, according to processes of the present invention.

Advantages

The system of the present invention alerts a user when another user is browsing the same Web entity. The system allows real time chat and sharing of content links and metacontent between users browsing the same domain. The system increases engagement (page views, time spent) on the Web. The system increases monetization opportunity (delivering ads to and sponsoring the sharing service). The system allows a user to discover new "friends" to add to a user's social network. The system provides incentive to register, to disclose personal information and to log into the sharing service.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of sharing Web content between users, the method comprising:
    associating a first user with a current Web domain being browsed by the first user by parsing a current uniform resource locator (URL) of a current Web page viewed by the first user;
    creating a Web content sharing group by identifying one or more other users with which the first user would like to share and adding the first user and the one or more other users to the Web content sharing group;
    associating with the first user in the Web content sharing group a Web page URL of a current Web page being browsed by each of the one or more other users;
    calculating a status of each of the one or more other users in the Web content sharing group by determining if each of the one or more other users is browsing a different Web page in the same Web domain as the first user, the current Web page viewed by the first user, or a Web page not in the same Web domain as the first user, the Web domain comprising a plurality of Web pages associated with a single URL; and
    communicating each Web page URL of each of the at least one other users of the Web content sharing group and the status of each of the at least one other users of the Web content sharing group to the first user.

2. The method of claim 1, where the one or more other users are one of:
    known users to the first user; or
    unknown users to the first user.

3. The method of claim 1, wherein the one or more other users are known to the first user, and wherein the identifying the one or more other users includes accessing at least one of:
    an internet protocol address of a computer of the first user;
    a buddy of the first user;
    a contact of the first user;
    a friend of the first user;
    a login identification of the first user;
    a third party application program interface associated with the first user.

4. The method of claim 1, wherein the one or more other users are unknown to the first user, and wherein the identifying the one or more other users includes at least one of:
    calculating an attribute-matching metric using any combination of geographic attributes, demographic attributes, psychographic attributes, biographic attributes and behavioral attributes.

5. The method of claim 1, further comprising:
    keeping an archive of specified pages that another user of the Web content sharing group visited; and
    receiving a request from a computer of the first user to access the archive.

6. The method of claim 1, further comprising receiving at least one of:
    a request to opt in to sharing on a session basis;
    a request to opt in to sharing on a page-by-page basis;
    a request to opt out of sharing on a session basis; and
    a request to opt out of sharing on a page-by-page basis.

7. A method of sharing Web content between users, the method comprising:
    receiving uniform resource locators of current Web pages being viewed by a first user and at least one other user of a Web content sharing group;
    receiving a status of users of a Web content sharing group associated with a current Web entity of a user, the status is calculated by determining if the at least one other user is browsing a different Web page in a same Web domain as the first user, the current Web page viewed by the first user, or a Web page not in the same Web domain as the first user, the Web domain comprising a plurality of Web pages associated with a single URL;
    representing visually the uniform resource locators of the current pages and the status of the users of the Web content sharing group to the first user;
    receiving a selection of one or more users in the Web content sharing group; and
    communicating the selection with a computer of the one or more users.

8. The method of claim 7, wherein the communicating includes either sending or receiving content associated with either a current page of the first user or a current page of a selected user in the Web content sharing group.

9. The method of claim 7, wherein the one or more users in the Web content sharing group are associated with a rough proximity indicator to the current Web page of the first user.

10. The method of claim 7, wherein further comprising communicating via one of a concurrent chat or file sharing session with the selection.

11. The method of claim 7, wherein an interface of the Web content sharing group is at least one of:
    a menu of a browser toolbar;
    a pop-up of a plug-in;
    a separate interface of an executable program; and
    an embedded module of a Web page.

12. The method of claim 7, further comprising sending at least one of:
    a request to opt in to sharing on a session basis;
    a request to opt in to sharing on a page-by-page basis;
    a request to opt out of sharing on a session basis; and
    a request to opt out of sharing on a page-by-page basis.

13. The method of claim 7, further comprising running two or more different instances of a Web content sharing group over two or more different Web browser instances, wherein each of the two or more different instances of the Web content sharing group may be associated with different current Web pages.

14. The method of claim 7, further comprising representing visually a concurrent page-by-page browsing experience of one or more users of the Web content sharing group.

15. An apparatus for sharing Web content between users, the apparatus being configured to:
    associate a first user with a current Web domain being browsed by the first user by parsing a current uniform resource locator (URL) of a current Web page viewed by the first user;
    create a Web content sharing group by identifying one or more other users with which the first user would like to share and adding the first user and the one or more other users to the Web content sharing group;

associate with the first user in the Web content sharing group a Web page URL of a current Web page being browsed by each of the one or more other users;

calculate a status of each of the one or more other users in the Web content sharing group by determining if each of the one or more other users is browsing a different Web page in the same Web domain as the first user, the current Web page viewed by the first user, or a Web page not in the same Web domain as the first user, the Web domain comprising a plurality of Web pages associated with a single URL; and communicate each Web page URL of each of the at least one other users of the Web content sharing group and the status of each of the at least one other users of the Web content sharing group to the first user.

16. The apparatus of claim 15, where the one or more other users are one of:
   known users to the first user; or
   unknown users to the first user.

17. The apparatus of claim 15, wherein the one or more other users are known to the first user, and wherein the identifying the one or more other users includes accessing at least one of:
   an internet protocol address of a computer of the first user;
   a buddy of the first user;
   a contact of the first user;
   a friend of the first user;
   a login identification of the first user;
   a third party application program interface associated with the first user.

18. The apparatus of claim 15, wherein the one or more other users are unknown to the first user, and wherein the identifying the one or more other users includes at least one of:
   calculating an attribute-matching metric using any combination of geographic attributes, demographic attributes, psychographic attributes, biographic attributes and behavioral attributes.

19. The apparatus of claim 15, wherein the apparatus is further configured to:
   keep an archive of specified pages that another user of the Web content sharing group visited; and
   receive a request from a computer of the first user to access the archive.

20. The apparatus of claim 15, wherein the apparatus is further configured to receive at least one of:
   a request to opt in to sharing on a session basis;
   a request to opt in to sharing on a page-by-page basis;
   a request to opt out of sharing on a session basis; and
   a request to opt out of sharing on a page-by-page basis.

21. A apparatus for sharing Web content between users, apparatus being configured to:
   receive uniform resource locators of current Web pages being viewed by a first user and at least one other user of a Web content sharing group;
   receive a status of users of a Web content sharing group associated with a current Web entity of a user, the status is calculated by determining if the at least one other user is browsing a different Web page in a same Web domain as the first user, the current Web page viewed by the first user, or a Web page not in the same Web domain as the first user, the Web domain comprising a plurality of Web pages associated with a single URL;
   represent visually the uniform resource locators of the current pages and the status of the users of the Web content sharing group to the first user;
   receive a selection of one or more users in the Web content sharing group; and
   communicate the selection with a computer of the one or more users.

22. The apparatus of claim 21, wherein the apparatus is further configured to communicate by either sending or receiving content associated with either a current page of the first user or a current page of a selected user in the Web content sharing group.

23. The apparatus of claim 21, wherein the one or more users in the Web content sharing group are associated with a rough proximity indicator to the current Web entity of the first user.

24. The apparatus of claim 21, wherein the apparatus is further configured to communicate via one of a concurrent chat or file sharing session with the selection.

25. The apparatus of claim 21, wherein an interface of the Web content sharing group is at least one of:
   a menu of a browser toolbar;
   a pop-up of a plug-in;
   a separate interface of an executable program; and
   an embedded module of a Web page.

26. The apparatus of claim 21, wherein the apparatus is further configured to send at least one of:
   a request to opt in to sharing on a session basis;
   a request to opt in to sharing on a page-by-page basis;
   a request to opt out of sharing on a session basis; and
   a request to opt out of sharing on a page-by-page basis.

27. The apparatus of claim 21, wherein the apparatus is further configured to run two or more different instances of a Web content sharing group over two or more different Web browser instances, wherein each of the two or more different instances of the Web content sharing group may be associated with different current Web pages.

28. The apparatus of claim 21, wherein the apparatus is further configured to represent visually a concurrent page-by-page browsing experience of one or more users of the Web content sharing group.

29. A non-transitory computer readable medium carrying one or more instructions for sharing Web content between users, wherein the one or more instructions, when executed by one or more processors, cause the one or more processors to perform the steps of:
   associating a first user with a current Web domain being browsed by the first user by parsing a current uniform resource locator (URL) of a current Web page viewed by the first user;
   creating a Web content sharing group by identifying one or more other users with which the first user would like to share and adding the first user and the one or more other users to the Web content sharing group;
   associating with the first user in the Web content sharing group a Web page URL of a current Web page being browsed by each of the one or more other users;
   calculating a status of each of the one or more other users in the Web content sharing group, the status is calculated by determining if each of the one or more other users is browsing a different Web page in the same Web domain as the first user, the current Web page viewed by the first user, or a Web page not in the same Web domain as the first user, the Web domain comprising a plurality of Web pages associated with a single URL; and
   communicating each Web page URL of each of the at least one other users of the Web content sharing group and the status of each of the at least one other users of the Web content sharing group to the first user.

* * * * *